Figure 1:
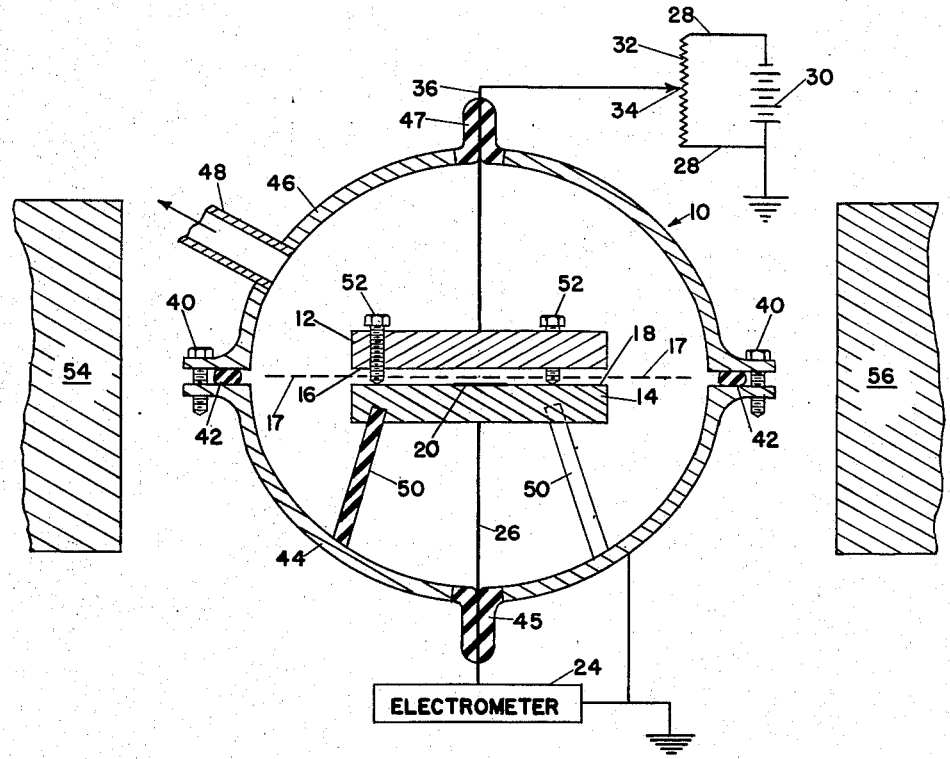

INVENTOR.
GIOACCHINO FAILLA
HARALD H. ROSSI
BY Roland A. Anderson
Attorney

Nov. 17, 1953

G. FAILLA ET AL 2,659,826

RADIATION MEASURING DEVICE

Filed Jan. 24, 1951

2 Sheets-Sheet 2

*INVENTOR.*
GIOACCHINO FAILLA
HARALD H. ROSSI

BY
Roland A. Anderson
Attorney

Patented Nov. 17, 1953

2,659,826

UNITED STATES PATENT OFFICE 2,659,826

RADIATION MEASURING DEVICE

Gioacchino Failla, New York, and Harald H. Rossi, Orangeburg, N. Y., assignors to the United States of America as represented by the United States Atomic Energy Commission Application January 24, 1951, Serial No. 207,578

10 Claims. (Cl. 250—83.3)

The present invention relates to a method and apparatus for measuring the absolute radioactivity of radioactive samples which emit charged particles.

One of the most direct methods for measuring the quantity of a radioactive material emitting beta rays is to measure the charge carried away from the source by the beta rays. A method and apparatus useful in carrying out the measurement of the quantity of a beta emitting radioactive material is adaptable to the measurement of the radioactivity of other emitters of charged particle radiation (such as alpha radiation). If the quantity is to be expressed in curies it is also necessary to know the disintegration scheme of the radioactive material under consideration when the number of beta rays (or charged particles of any kind) emitted per unit time is not the same as the number of atoms of the material disintegrating per unit time.

Heretofore measurements of this type have been relatively inaccurate when made with very elaborate apparatus and highly inaccurate when made with the usual Geiger-Müller counter setups. For example, the results of an interlaboratory comparison of measurements of $I^{131}$ conducted recently under the direction of the Bureau of Standards, show that the measurements by the twenty-six cooperating institutions varied over a range of some 300 percent.

It is accordingly an object of the present invention to provide a simple apparatus for making measurements of the emission of charged particles from a radioactive source.

It is another object of the present invention to provide an apparatus capable of making absolute measurements of the emission of charged particles from a radioactive source very accurately.

It is a further object of the present invention to provide a method of making highly accurate measurements of the emission of charged particles from a radioactive source in order to determine the absolute quantity of such source in curies.

Other objects will be in part apparent and in part pointed out hereinafter.

In one of its broader aspects the objects of the present invention may be achieved by providing two geometrically similar elements juxtaposed in an evacuated chamber, disposing a radioactive substance on one of the confronting faces of the two elements, providing means for generating a magnetic field, the lines of flux of said field being substantially parallel to the confronting surfaces of the elements, and providing means for measuring the rate of development of a charge on at least one of said elements. With the method and apparatus of this invention the presence of gamma radiation accompanying the beta rays does not interfere with the measurement.

Figure 2:
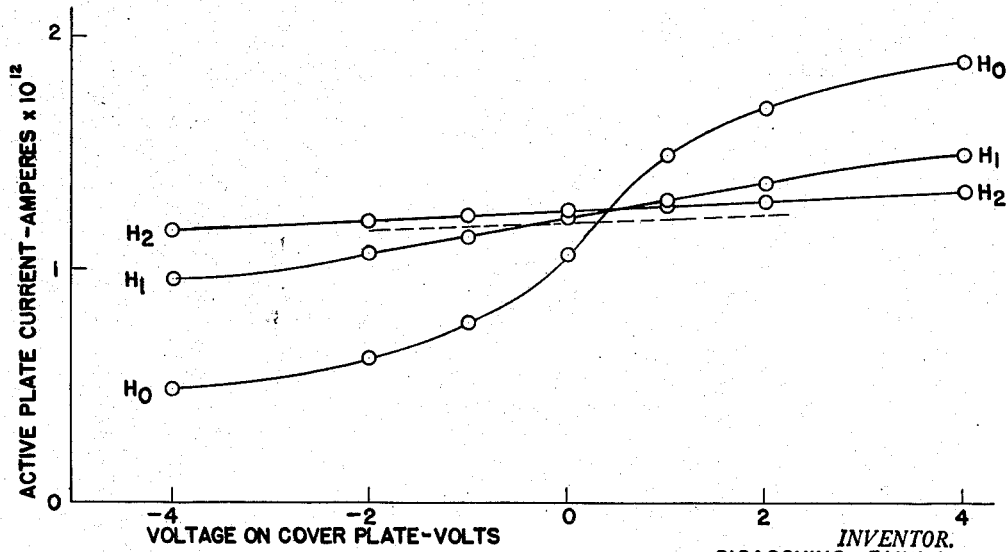
Figure 3:
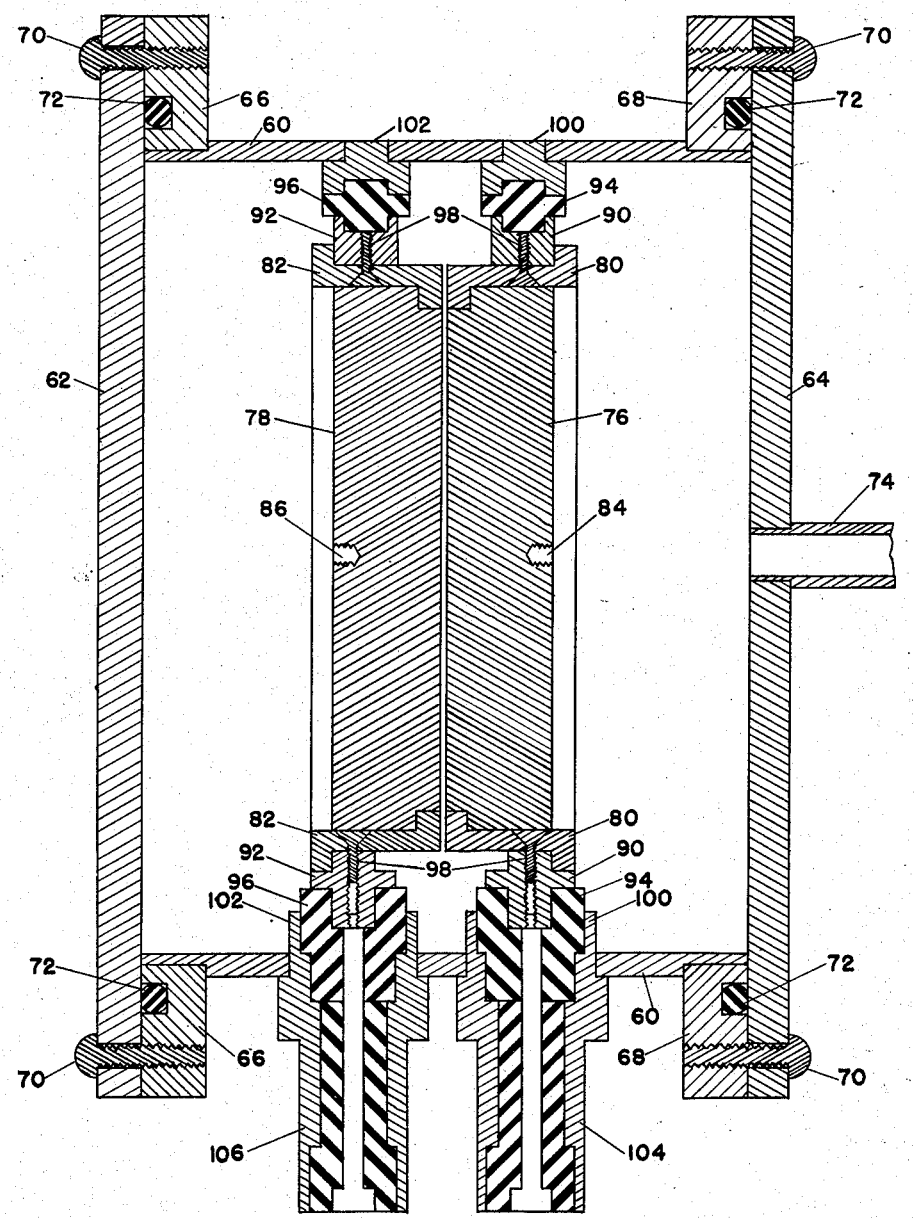

Reference is made to the accompanying drawings describing an embodiment of the present invention wherein:

Figure 1 is a vertical section of the apparatus of the present invention shown in relation to conventional electronic equipment, Figure 2 is a plot of the current-voltage relationship developed in the apparatus of Figure 1, and Figure 3 is a vertical section of a modification of the chamber shown in Figure 1.

Referring now particularly to Figure 1, one apparatus which has been found satisfactory for producing highly accurate measurements comprises in general an evacuated container 10 consisting of upper and lower hemispherical halves 44 and 46 respectively, two juxtaposed plates 12 and 14, insulating means 50 for supporting the plates 12 and 14 in the chamber, insulating means 52 for keeping the plates separated to a desired extent, externally disposed means 54 and 56 for providing a magnetic field, means 48 for evacuating the chamber 10, and the appropriate electrical circuits attached through the hemispheres to the upper and lower plates 12 and 14 by the conductors 36 and 26, respectively.

The two hemispheres, 44 and 46 of the spherical container 10, are preferably hermetically sealed by the compression of an annular gasket 42 between the confronting flanges of the hemispheres by the tightening of the bolts 40 which are threaded into the flange of hemisphere 44. The container 10 is evacuated by connecting a pump (not shown) to the pipe 48. The two plates 12 and 14 are supported in a horizontal generally central position within the container 10 by three insulating legs 50 which are imbedded in the lower surface of plate 14. The opposing faces 16 and 18 of the plates 12 and 14 respectively, are separated to a desired degree by adjustment of the insulating screw members 52. A radioactive substance is deposited centrally over a small area on the face of one of the plates.

The surfaces 16 and 18 should have the same scattering characteristics with respect to charged particles and they should preferably be kept at a relatively small clearance with respect to the width thereof. This close spacing will effectively reduce the number of charged particles which are emitted from the radioactive source 20 in such a direction that they may pass through the space between the plates without depositing in either plate. The layer of radioactive material is preferably in the order of a fraction of a micron in thickness and in the ideal case would be about one molecular layer in thickness. This extreme thinness of the radioactive layer is important in all methods of measurement in that it minimizes the self-absorptive tendency of the layer with respect to charged particles.

It is essential to the satisfactory operation of the present apparatus that one-half the number of particles emitted from the layer 20 be ultimately absorbed in either plate. Similar scattering characteristics of the plates with respect to primary charged particles and with respect to the secondaries produced by the primaries impinging on the plates insure this result. Since self-absorption takes place on one layer only and prevents equal distribution between the plates the active layer should be made very thin to minimize such self-absorption. It is also essential that the radioactive material be deposited on the plate in the form which is chemically stable under vacuum and which has a very low vapor pressure. This effectively avoids contamination of the apparatus and of the other plate with radioactive material from the layer 20. The geometry of the confronting plates should be substantially identical. It will be understood that any two geometric surfaces which are mirror images of each other will be satisfactory for the operation of the present invention.

Applicants have used this geometrical arrangement to make sure that a high energy charged particle such as a beta particle emitted from the radioactive layer will have an equal statistical chance to lodge in one plate as in the other when the two plates are closely separated and at the same potential. Also, if such a particle is scattered from one of the surfaces 16 or 18, a particle will similarly be scattered from the other face when considered from a statistical point of view. The operation of the apparatus is therefore dependent on the symmetry of the confronting plates and the statistically equal distribution of charged particles both primary and secondary between the two plates.

In order to determine the correct value of the current which flows to each plate when there is an equal statistical distribution of the charged particles between the plates, the apparatus may be permeated by a variable magnetic field, the lines of flux of said field being substantially parallel to the surfaces 16 and 18 of the plates. The magnetic field has the effect of causing low energy secondary electrons liberated as a result of bombardment by high energy charged particles to be, for the most part, curved around the lines of flux of the field and to be thereby returned to the plate from which they originated. By successively measuring the current flowing to or from one plate when the plates are at several different potentials, and the gap therebetween is permeated by several different flux densities, the current which flows when there is an equal distribution of charged particles to each plate may be determined. The radioactivity which this current represents may then be determined from a knowledge of the charge on each particle, by converting the current into the number of particles emitted, doubling this value, and dividing by $3.7 \times 10^{10}$ which is the number of disintegrations per second for one curie of radioactive material, when one charged particle is emitted per disintegration. Satisfactory measurements could be made without the magnetic field, provided the two surfaces 16 and 18 had identical secondary electron producing characteristics and provided they were kept at exactly the same potential. Since these conditions are not readily met in practice the presence of the magnetic field brings about an important simplification and permits higher accuracy in the measurement of the absolute number of charged particles emitted by the radioactive substance.

It is thus essential that the current flowing from at least one plate be measured. For this purpose conventional electrometer 24 may be connected by a conductor 26 to one of the plates, for example 14. The conductor 26 is sealed through the lower hemisphere 44 at the insulating portion 45. Electrometer 24 is used as a detector in a conventional null type circuit. The electrometer 24 and sphere 44—46 may be connected to a common ground in any suitable conventional manner. To impress a voltage between the plates 12 and 14, a conductor 36 which is sealed through the upper hemisphere 46 at the insulating portion 47 is connected to a variable source of potential. Such a variable source may consist, for example, of a resistance 32 having a voltage impressed thereon from a source 30 through a connector 28. The voltage selected may be varied by the positioning of slider contact 34. If the voltage on the cover plate 12 is varied as indicated in the graph of Figure 2 a change in the current flowing from the active plate 14 will be noted. The curve $H_0$ represents the change in current with voltage when a low magnetic field exists between electromagnet poles 54 and 56 and permeates the clearance between the confronting surfaces 16 and 18. It will be noted that when the voltage on the plate 12 is negative and the radioactive material on surface 18 emits negative beta rays the current detected thereon is small. As the voltage is decreased and then is made positive the current increases and goes through an inflection point.

When a stronger magnetic field permeates the space between the confronting faces, a curve $H_1$ results from the plot of the current against the voltage. As the magnetic field is increased in strength, the curve assumes the shape of curve $H_2$. With an excessively strong magnetic field the plot assumes the shape of the broken line shown because of the suppression of some of the primary beta particles emitted by the source. Magnetic fields up to 1000 gauss are useful in these determinations where the clearance between the plates is in the order of one millimeter. In general for smaller clearances stronger magnetic fields are required. The value of the current representing equal distribution of the primary charged particles between the plates is that at which the curves cross. It will be noted that not all the curves cross at the same point but their variation is usually not in excess of one percent. At present this is considered to be very satisfactory accuracy in the measurement of radioactive isotopes.

It will be understood that the foregoing embodiment is given for illustrative purposes and that the concept of the present invention is not limited thereto. Substantial variation in the apparatus as described and of auxiliary apparatus employed therewith may be made. The particular shape and dimensions of the various elements of the apparatus are subject to wide variations. For example, the container may be any shape which is capable of enclosing two geometrically similar confronting elements in insulated relation. These elements may be made to stand at any angle within the container so long as they are maintained in close juxtaposition and have similarly shaped confronting surfaces with similar scattering characteristics for charged particle radiation. Any conventional means may be employed for suspending the members in insulated relation in the evacuated chamber and for keeping them in spaced relation from each other.

One such modified form of the apparatus illustrated in Figure 1 which has been found particularly useful in carrying out the present invention is illustrated in Figure 3. Referring to Figure 3, a container consists of a cylindrical shell 60 which is closed at each end by the circular end plates 62 and 64. Two annular rings 66 and 68 are welded to the external edges of the cylinder 60 to form flanges. Annular gaskets 72 are fitted into annular channels in the outer surface of flange rings 66 and 68. The channel rings 66 and 68 are also provided with threaded holes to receive screws 70 so that the plates 62 and 64 may be urged into contact with the ring gaskets 72 to form a hermetic seal. The chamber may be evacuated by connecting the pipe 74 to a pump (not shown).

Within the evacuated chamber the two collector plates 76 and 78 are supported in vertical position by the holding rings 80 and 82, respectively. Access to the plates 76 and 78 is had by removal of the end plates 64 and 62, respectively. The collector plates may be removed from the holding rings by screwing a handle into the threaded openings 84 and 86 in the backs thereof. The holding rings 80 and 82 are secured in the chamber by support members 90 and 92, respectively, and the support members are in turn supported by the insulating spacers 94 and 96, respectively. The spacers 94 and 96 are imbedded in receiving mounts 100 and 102, respectively, which mounts are hermetically sealed in the cylindrical wall 60. Four such sets of support members, insulating spacers, and receiving mounts of appropriate configurations are disposed in equidistantly spaced relation around the holding rings 80 and 82 between these rings and the cylindrical wall 60. The screw members 98 prevent the holding rings from sliding off the support members. Electrical contact may be made between the collector plates and the chamber exterior by insertion of conducting stems (not shown) through the internally insulated projections 104 and 106 of the receiving mounts 100 and 102, respectively, to contact the support members 90 and 92.

Plates having a diameter of approximately three inches and spaced about one millimeter apart give very satisfactory results when the radioactive material is deposited within a reasonably small area at the center of one plate. The solid angle subtended at the center of the plates of this size and spacing is less than one percent of the total. Close spacing is necessary in order to prevent a significant number of primary beta rays from going directly out the gap. By connecting together the stems making electrical contact with the plates as they leave projections 104 and 106 and measuring the net loss of current from both the plates at the same time, it is possible to measure the number of particles which pass from the radioactive source through the gap without impinging on either plate. Variations of this gap width in the range of one-half to two millimeters have no apparent effect on the measured primary current. It is important to note that the procedure just described makes possible the measurement of the loss of negative charge by the plates caused by the emission of secondary beta rays from the exterior surfaces of the plates when gamma rays are emitted by the radioactive material and traverse the plates. If the gap is so small that escape of primary negative electrons through it is negligible, the current measured with the two plates connected together represents the number of secondary electrons produced by the gamma rays per second, leaving the exterior surfaces of both plates. By virtue of the symmetrical arrangement one-half of this number leaves each plate. Therefore, the current corresponding to one-half of this number must be subtracted from the current measured with only the active plate connected to the electrometer sysem. In the usual measuring technique, the plate containing the active material is connected to the current detector while the cover plate is connected to a variable voltage source.

The plates may be constructed from various materials and should have a thickness greater than the range of the beta rays or other charged radiation being emitted. Plates constructed from polystyrene and made conducting at the surface by the application of a conducting substance such as a colloidal graphite in a plastic binder are preferable because such plates are substantially unreactive with the water of the solution of the radioactive material which is applied. Metals may also be used, but because a reaction may occur between the metal surface and the applied solution of radioactive material (even when such solutions are neutral), it is preferred to use plates composed of noble or other unreactive metals. Such a reaction even to a small extent leads to inaccuracies because of the resultant self-absorption within the source.

An alternative is to suspend the film of radioactive material on a thin membrane such as a membrane of a plastic material. The film membrane may be suspended in the position indicated by the broken line 17 of Figure 1 for example. If the membrane is rendered conducting by surface coating with graphite or other conducting material the current lost from the membrane due to emission of charged particles can be measured.

The pressure within the chamber should be kept below that for which an ionization current may be detected due to the ionization of the gas in the chamber. For close spacing of the plates, in the order of one millimeter, a pressure of less than 50 microns of mercury is sufficient to prevent any ion current from interfering with the results.

The measurements made with the apparatus described herewith check within a few percent measurements made by much more complicated and time-consuming methods.

Since many embodiments might be made of the present invention and since many changes might be made in the embodiments described, it is to be understood that the foregoing description is to be interpreted as illustrative only and not in a limiting sense.

We claim:

1. A method of measuring the number of charged particles being emitted from a radioactive source in a given interval of time which comprises collecting at least 99 percent of the liberated charged particles on two symmetrical conducting elements juxtaposed in insulated relation in an evacuated region, the confronting surfaces of said elements having substantially the same scattering and secondary electron producing characteristics with respect to charged particle radiation, and measuring the rate at which a charge is developed on at least one of said elements.

2. A method of measuring the total number of charged particles being emitted from a radioactive source in a given interval of time which comprises collecting at least 99 percent of the liberated charged particles on two symmetrical conducting elements juxtaposed in insulated relation in an evacuated region, the confronting surfaces of said elements having substantially the same scattering and secondary electron producing characteristics with respect to charged particle radiation, impressing a voltage between said elements, varying said voltage through zero potential and measuring the rate at which a charge is developed on at least one of said members for each voltage impressed.

3. A method of measuring the total number of charged particles being emitted from a radioactive source in a given interval of time which comprises collecting the liberated charged particles on two symmetrical conducting elements juxtaposed in insulated relation in an evacuated region, the confronting surfaces of said elements having substantially the same scattering and secondary electron producing characteristics with respect to charged particle radiation, permeating the space between said plates with a magnetic field, and measuring the rate at which a charge is developed on at least one of said members.

4. A method of measuring the total number of charged particles being emitted from a radioactive source in a given interval of time which comprises collecting the liberated charged particles on two closely spaced symmetrical elements juxtaposed in insulated relation in an evacuated region, impressing a voltage between said elements, permeating the space between said plates with a magnetic field, the lines of flux of which are substantially parallel to the confronting faces, varying the voltage impressed and the field strength of the magnetic field, and measuring the rate at which a charge is developed on at least one of said members for a plurality of voltages and field strengths.

5. A method of measuring the total number of charged particles being emitted from a radioactive source in a given interval of time which comprises collecting the liberated charged particles on two symmetrical conducting elements juxtaposed in insulated relation in an evacuated region, the confronting surfaces of said elements having the same scattering characteristics with respect to charged particle radiation, permeating the space between said plates with a magnetic field having a strength of less than 1,000 gauss, the lines of flux of said field being substantially parallel to the confronting surfaces, and measuring the rate at which a charge is developed on at least one of said members.

6. An apparatus suitable for measuring the total amount of charged radiation emitted from a radioactive source in a given interval of time which comprises an evacuated chamber, two geometrically similar elements proximately juxtaposed in insulated relation in said evacuated chamber, a radioactive substance deposited in the central portion of one of the confronting faces of one of said elements, said faces being disposed to intercept at least 99 percent of the charged particles liberated from said substance and means for measuring the rate of development of charge on at least one of said elements.

7. An apparatus suitable for measuring the total amount of charged radiation emitted from a radioactive source in a given interval of time which comprises an evacuated chamber, two geometrically similar elements proximately juxtaposed in insulated relation in said chamber, means for impressing a variable voltage between said elements in said evacuated chamber, a radioactive substance deposited in the central portion of one of the confronting faces of one of said elements, said faces being disposed to intercept at least 99 percent of the charged particles liberated from said substance and means for measuring the rate of development of charge on at least one of said elements.

8. An apparatus suitable for measuring the total amount of charged radiation emitted from a radioactive source in a given interval of time which comprises an evacuated chamber, two geometrically similar elements proximately juxtaposed in insulated relation in said chamber, means for permeating the space between said elements with a magnetic field, the lines of flux of said field being substantially parallel to the confronting faces of said elements, a radioactive substance deposited on one of the confronting faces of one of said elements and means for measuring the rate of development of charge on at least one of said elements.

9. An apparatus for measuring the total amount of charged radiation emitted from a radioactive source in a given interval of time which comprises an evacuated chamber, two geometrically similar elements proximately juxtaposed in insulated relation in said chamber, means for permeating the space between said elements with a variable magnetic field, the lines of flux of said field being substantially parallel to the confronting faces of said elements, means for impressing a variable voltage between said elements, and means for measuring the rate of development of charge on at least one of said elements.

10. An apparatus suitable for measuring the total amount of charged radiation emitted from a radioactive source in a given interval of time which comprises an evacuated chamber, two geometrically similar elements proximately juxtaposed in insulated relation in said chamber, means for permeating the space between said elements with a variable magnetic field having strengths of less than 1,000 gauss, the lines of flux of said field being substantially parallel to the confronting faces of said elements in said evacuated chamber, a radioactive substance deposited on one of the confronting faces of one of said elements and means for measuring the rate of development of charge on at least one of said elements.

GIOACCHINO FAILLA.
HARALD H. ROSSI.

(References on following page)

References Cited in the file of this patent

UNITED STATES PATENTS

| Number | Name | Date |
|---|---|---|
| 2,032,545 | McElrath | Mar. 3, 1936 |
| 2,462,351 | Blau et al. | Feb. 22, 1949 |
| 2,472,766 | Woodbridge | June 7, 1949 |
| 2,500,455 | Fisher | Mar. 14, 1950 |
| 2,521,656 | Segre et al. | Sept. 5, 1950 |

OTHER REFERENCES

Introduction to Modern Physics, Richtmyer et al., 1947, published by McGraw Hill Book Co., New York, N. Y. pages 554–560.

Radioactive Standards and Methods of Testing Instruments used in the Measurment of Radioactivity, Curtiss, Reprint from the Proceedings of the I. R. E., vol. 37, No. 8. Aug. 1949, pages 913–922.